(12) United States Patent
Mohammed Al-Saud et al.

(10) Patent No.: US 9,099,214 B2
(45) Date of Patent: Aug. 4, 2015

(54) CONTROLLING MICROPARTICLES THROUGH A LIGHT FIELD HAVING CONTROLLABLE INTENSITY AND PERIODICITY OF MAXIMA THEREOF

(71) Applicants: Turki Saud Mohammed Al-Saud, Riyadh (SA); Soliman Hammad Al-Khowaiter, Riyadh (SA); Muhanna Kamal Al-Muhanna, Riyadh (SA); Sergey Solonevich, Minsk (BY); Anatol Ryzhevich, Minsk (BY); Nikolai Kazak, Minsk (BY)

(72) Inventors: Turki Saud Mohammed Al-Saud, Riyadh (SA); Soliman Hammad Al-Khowaiter, Riyadh (SA); Muhanna Kamal Al-Muhanna, Riyadh (SA); Sergey Solonevich, Minsk (BY); Anatol Ryzhevich, Minsk (BY); Nikolai Kazak, Minsk (BY)

(73) Assignee: KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 0 days.

(21) Appl. No.: 13/710,490

(22) Filed: Dec. 11, 2012

(65) Prior Publication Data

US 2013/0099108 A1    Apr. 25, 2013

(51) Int. Cl.
*G21K 5/04*    (2006.01)
*G02B 15/14*    (2006.01)
(Continued)

(52) U.S. Cl.
CPC .. *G21K 5/04* (2013.01); *G02B 5/04* (2013.01); *G02B 15/14* (2013.01); *G21K 1/006* (2013.01)

(58) Field of Classification Search
CPC ......... G21K 1/003; G21K 1/006; G21K 5/04; G02B 5/04; G02B 15/14

USPC .......................................................... 250/251
See application file for complete search history.

(56) References Cited

U.S. PATENT DOCUMENTS 3,160,696 A    12/1964    Gamo
3,808,550 A *    4/1974    Ashkin ........................... 372/97
(Continued)

FOREIGN PATENT DOCUMENTS

CN    202048982 U    11/2011
EP    0451852 A1    10/1991
(Continued)

OTHER PUBLICATIONS

Ryzhevich, A., et al., "Application of Ring Laser Fields for Microstructures Creation," Nonlinear Phenomena in Complex Systems vol. 14, No. 3 (Nov. 2011).*
(Continued)

*Primary Examiner* — Jack Berman
*Assistant Examiner* — Wyatt Stoffa
(74) *Attorney, Agent, or Firm* — Raj Abhyanker, P.C.

(57) ABSTRACT

A method includes providing a capability to control divergence of a coherent light beam having an axially symmetrical distribution of intensity thereof through an optical divergence controller, and directing an output of the optical divergence controller related to the controlled divergence of the coherent light beam onto a glass prism. The glass prism includes a planar shape onto which a pyramidal structure is formed. The method also includes controlling a distance between maxima of an output light field of the glass prism and intensity thereof through controlling the divergence of the coherent light beam through the optical divergence controller and/or varying a distance between the optical divergence controller and the glass prism, and utilizing the output light field of the glass prism in controlling microparticles in a microtechnology or a nanotechnology application.

7 Claims, 7 Drawing Sheets

(51) Int. Cl.
*G02B 5/04* (2006.01)
*G21K 1/00* (2006.01)

(56) References Cited

U.S. PATENT DOCUMENTS

| | | | |
|---|---|---|---|
| 4,623,930 A | 11/1986 | Oshima et al. | |
| 4,630,184 A * | 12/1986 | Ferrero | 362/351 |
| 4,710,817 A | 12/1987 | Ando | |
| 4,759,628 A | 7/1988 | Tatsuno et al. | |
| 4,979,221 A | 12/1990 | Perryman et al. | |
| 5,021,854 A | 6/1991 | Huth | |
| 5,157,473 A | 10/1992 | Okazaki | |
| 5,198,660 A | 3/1993 | Yokoyama et al. | |
| 5,212,382 A | 5/1993 | Sasaki et al. | |
| 5,262,871 A | 11/1993 | Wilder et al. | |
| 5,301,240 A | 4/1994 | Stockum et al. | |
| 5,308,976 A | 5/1994 | Misawa et al. | |
| 5,363,190 A | 11/1994 | Inaba et al. | |
| 5,412,422 A | 5/1995 | Yamada et al. | |
| 5,448,056 A | 9/1995 | Tsuruta | |
| 5,467,128 A | 11/1995 | Yates et al. | |
| 5,468,954 A | 11/1995 | Furukawa | |
| 5,557,542 A | 9/1996 | Asahina et al. | |
| 5,565,915 A | 10/1996 | Kindo et al. | |
| 5,631,704 A | 5/1997 | Dickinson et al. | |
| 5,650,643 A | 7/1997 | Konuma | |
| 5,665,959 A | 9/1997 | Fossum et al. | |
| 5,705,807 A | 1/1998 | Throngnumchai et al. | |
| 5,708,471 A | 1/1998 | Okumura | |
| 5,754,690 A | 5/1998 | Jackson et al. | |
| 5,777,669 A | 7/1998 | Uwatoko et al. | |
| 5,841,126 A | 11/1998 | Fossum et al. | |
| 5,892,541 A | 4/1999 | Merrill | |
| 5,923,369 A | 7/1999 | Merrill et al. | |
| 5,978,025 A | 11/1999 | Tomasini et al. | |
| 6,028,300 A | 2/2000 | Rhoads et al. | |
| 6,078,037 A | 6/2000 | Booth, Jr. | |
| 6,115,065 A | 9/2000 | Yadid-Pecht et al. | |
| 6,118,482 A | 9/2000 | Clark et al. | |
| 6,130,423 A | 10/2000 | Brehmer et al. | |
| 6,130,713 A | 10/2000 | Merrill | |
| 6,157,016 A | 12/2000 | Clark et al. | |
| 6,181,375 B1 | 1/2001 | Mitsui et al. | |
| 6,236,449 B1 * | 5/2001 | Tanitsu | 355/67 |
| 6,248,990 B1 | 6/2001 | Pyyhtiä et al. | |
| 6,282,028 B1 * | 8/2001 | Waibel et al. | 359/618 |
| 6,297,488 B1 | 10/2001 | Beraldin et al. | |
| 6,330,030 B1 | 12/2001 | O'Connor | |
| 6,359,274 B1 | 3/2002 | Nixon et al. | |
| 6,366,312 B1 | 4/2002 | Crittenden | |
| 6,476,864 B1 | 11/2002 | Borg et al. | |
| 6,580,454 B1 | 6/2003 | Perner et al. | |
| 6,587,145 B1 | 7/2003 | Hou | |
| 6,603,607 B2 * | 8/2003 | Matsui et al. | 359/642 |
| 6,631,022 B1 | 10/2003 | Kihira et al. | |
| 6,633,028 B2 | 10/2003 | Fowler | |
| 6,633,335 B1 | 10/2003 | Kwon et al. | |
| 6,677,996 B1 | 1/2004 | Chung et al. | |
| 6,735,072 B2 | 5/2004 | Liao | |
| 6,825,936 B2 | 11/2004 | Metcalfe et al. | |
| 6,831,263 B2 | 12/2004 | Skurnik et al. | |
| 6,873,282 B1 | 3/2005 | Murphy | |
| 6,884,982 B2 | 4/2005 | Beusch | |
| 6,909,462 B1 | 6/2005 | Shinotsuka et al. | |
| 6,927,433 B2 | 8/2005 | Hynecek | |
| 6,927,796 B2 | 8/2005 | Liu et al. | |
| 6,972,795 B1 | 12/2005 | Etoh et al. | |
| 6,977,685 B1 | 12/2005 | Acosta-Serafini et al. | |
| 6,982,403 B2 | 1/2006 | Yang et al. | |
| 7,053,947 B2 | 5/2006 | Sohn | |
| 7,115,963 B2 | 10/2006 | Augusto et al. | |
| 7,126,838 B2 | 10/2006 | Koizumi et al. | |
| 7,205,522 B2 | 4/2007 | Krymski | |
| 7,233,350 B2 | 6/2007 | Tay | |
| 7,245,250 B1 | 7/2007 | Kalayeh | |
| 7,262,402 B2 | 8/2007 | Niclass et al. | |
| 7,277,129 B1 | 10/2007 | Lee | |
| 7,280,221 B2 | 10/2007 | Wei | |
| 7,286,174 B1 | 10/2007 | Weale et al. | |
| 7,319,423 B2 | 1/2008 | Augusto et al. | |
| 7,319,486 B2 | 1/2008 | Shinotsuka | |
| 7,324,146 B2 | 1/2008 | Kanai | |
| 7,391,004 B2 | 6/2008 | Takashima et al. | |
| 7,426,036 B2 | 9/2008 | Feldchtein et al. | |
| 7,466,429 B2 | 12/2008 | de Groot et al. | |
| 7,483,058 B1 | 1/2009 | Frank et al. | |
| 7,502,107 B2 * | 3/2009 | Mohanty et al. | 356/317 |
| 7,504,616 B2 | 3/2009 | Nakamura et al. | |
| 7,522,288 B2 | 4/2009 | de Groot | |
| 7,547,872 B2 | 6/2009 | Niclass et al. | |
| 7,593,651 B2 | 9/2009 | Nicholls et al. | |
| 7,598,998 B2 | 10/2009 | Cernasov et al. | |
| 7,619,674 B2 | 11/2009 | Han et al. | |
| 7,623,173 B2 | 11/2009 | Nitta et al. | |
| 7,626,624 B2 | 12/2009 | Fraenkel et al. | |
| 7,696,463 B2 | 4/2010 | Kamiyama | |
| 7,697,051 B2 | 4/2010 | Krymski | |
| 7,701,499 B2 | 4/2010 | Barnea et al. | |
| 7,718,953 B2 * | 5/2010 | Prather et al. | 250/251 |
| 7,728,893 B2 | 6/2010 | Kagawa et al. | |
| 7,795,650 B2 | 9/2010 | Eminoglu et al. | |
| 7,847,846 B1 | 12/2010 | Ignjatovic et al. | |
| 7,858,917 B2 | 12/2010 | Stern et al. | |
| 7,868,665 B2 | 1/2011 | Tumer et al. | |
| 7,889,355 B2 | 2/2011 | de Lega et al. | |
| 7,911,520 B2 | 3/2011 | Shigematsu et al. | |
| 7,940,317 B2 | 5/2011 | Baxter | |
| 7,956,912 B2 | 6/2011 | Berezin | |
| 7,999,945 B2 | 8/2011 | Zara | |
| 8,026,471 B2 | 9/2011 | Itzler | |
| 8,077,328 B2 | 12/2011 | Scheibengraber et al. | |
| 8,089,036 B2 | 1/2012 | Manabe | |
| 8,089,522 B2 | 1/2012 | Choi et al. | |
| 8,093,624 B1 | 1/2012 | Renzi et al. | |
| 8,107,290 B2 | 1/2012 | Lee et al. | |
| 8,120,687 B2 | 2/2012 | Nishino et al. | |
| 8,126,677 B2 | 2/2012 | de Groot et al. | |
| 8,338,773 B2 | 12/2012 | Eldesouki et al. | |
| 8,405,038 B2 | 3/2013 | Bouhnik et al. | |
| 8,408,034 B2 | 4/2013 | Ishihara et al. | |
| 8,410,416 B2 | 4/2013 | Eldesouki et al. | |
| 8,426,797 B2 | 4/2013 | Aull et al. | |
| 8,462,248 B2 | 6/2013 | Berezin | |
| 8,471,750 B2 | 6/2013 | Rogers et al. | |
| 8,471,895 B2 | 6/2013 | Banks | |
| 8,531,566 B2 | 9/2013 | Cieslinski | |
| 8,564,785 B2 | 10/2013 | Newbury et al. | |
| 8,570,421 B2 | 10/2013 | Okada et al. | |
| 8,587,697 B2 | 11/2013 | Hussey et al. | |
| 8,587,709 B2 | 11/2013 | Kawahito et al. | |
| 8,619,168 B2 | 12/2013 | Choi et al. | |
| 8,653,435 B2 | 2/2014 | Eldesouki | |
| 8,665,342 B2 | 3/2014 | Al-Salem et al. | |
| 8,785,831 B2 | 7/2014 | Krymski | |
| 8,829,409 B2 | 9/2014 | Wadsworth | |
| 2001/0030277 A1 | 10/2001 | Rhoads | |
| 2001/0052941 A1 | 12/2001 | Matsunaga et al. | |
| 2002/0024058 A1 | 2/2002 | Marshall et al. | |
| 2003/0010896 A1 | 1/2003 | Kaifu et al. | |
| 2003/0103212 A1 | 6/2003 | Westphal et al. | |
| 2003/0193771 A1 | 10/2003 | Liao | |
| 2004/0058553 A1 * | 3/2004 | Tanaka | 438/710 |
| 2004/0189999 A1 | 9/2004 | De Groot et al. | |
| 2004/0243656 A1 | 12/2004 | Sung et al. | |
| 2005/0012033 A1 | 1/2005 | Stern et al. | |
| 2005/0248675 A1 | 11/2005 | Hashimoto et al. | |
| 2006/0044451 A1 | 3/2006 | Liang et al. | |
| 2006/0131480 A1 | 6/2006 | Charbon et al. | |
| 2006/0131484 A1 | 6/2006 | Peting | |
| 2006/0175529 A1 | 8/2006 | Harmon et al. | |
| 2006/0231742 A1 | 10/2006 | Forsyth | |
| 2006/0245071 A1 * | 11/2006 | George et al. | 359/665 |
| 2007/0022110 A1 | 1/2007 | Suda et al. | |
| 2007/0084986 A1 | 4/2007 | Yang et al. | |

(56) References Cited

U.S. PATENT DOCUMENTS

| | | | |
|---|---|---|---|
| 2008/0106603 A1 | 5/2008 | Whitehead et al. | |
| 2008/0230723 A1* | 9/2008 | Tanaka et al. | 250/492.2 |
| 2008/0231339 A1 | 9/2008 | Deschamps | |
| 2008/0252762 A1 | 10/2008 | Iwamoto et al. | |
| 2008/0279441 A1 | 11/2008 | Matsuo et al. | |
| 2009/0182528 A1 | 7/2009 | de Groot et al. | |
| 2009/0244971 A1 | 10/2009 | Lee et al. | |
| 2009/0256735 A1 | 10/2009 | Bogaerts | |
| 2010/0026838 A1 | 2/2010 | Belenky et al. | |
| 2010/0181491 A1 | 7/2010 | Karim et al. | |
| 2010/0182011 A1 | 7/2010 | Prescher et al. | |
| 2010/0204459 A1* | 8/2010 | Mason et al. | 530/408 |
| 2010/0213353 A1 | 8/2010 | Dierickx | |
| 2010/0245809 A1 | 9/2010 | Andreou et al. | |
| 2010/0270462 A1 | 10/2010 | Nelson et al. | |
| 2010/0271517 A1 | 10/2010 | De Wit et al. | |
| 2010/0315709 A1* | 12/2010 | Baer | 359/485 |
| 2011/0017918 A1 | 1/2011 | Baeumer et al. | |
| 2011/0090385 A1 | 4/2011 | Aoyama et al. | |
| 2011/0188120 A1* | 8/2011 | Tabirian et al. | 359/573 |
| 2011/0249148 A1 | 10/2011 | Prescher et al. | |
| 2011/0260039 A1 | 10/2011 | Fowler | |
| 2012/0056078 A1 | 3/2012 | Eldesouki et al. | |
| 2012/0057059 A1 | 3/2012 | Eldesouki et al. | |
| 2012/0057152 A1 | 3/2012 | Eldesouki et al. | |
| 2012/0091324 A1 | 4/2012 | Grund | |
| 2012/0113252 A1 | 5/2012 | Yang et al. | |
| 2012/0138774 A1 | 6/2012 | Kelly et al. | |
| 2012/0229669 A1 | 9/2012 | Okada et al. | |
| 2013/0057945 A1* | 3/2013 | Ueno et al. | 359/299 |
| 2013/0068928 A1 | 3/2013 | Eldesouki et al. | |
| 2013/0094030 A1 | 4/2013 | Sherif et al. | |
| 2013/0135486 A1 | 5/2013 | Wan | |
| 2013/0168535 A1 | 7/2013 | Eldesouki | |
| 2014/0097329 A1 | 4/2014 | Wadsworth | |

FOREIGN PATENT DOCUMENTS

| | | |
|---|---|---|
| EP | 1041637 A1 | 10/2000 |
| EP | 1104178 A1 | 5/2001 |
| EP | 1148348 A2 | 10/2001 |
| WO | 9918717 A1 | 4/1999 |
| WO | 2005069040 A1 | 7/2005 |
| WO | 2007043036 A1 | 4/2007 |
| WO | 20081511155 A2 | 12/2008 |
| WO | 2009042901 A1 | 4/2009 |
| WO | 2009115956 A2 | 9/2009 |
| WO | 2010124289 A1 | 10/2010 |
| WO | 2013105830 A1 | 7/2013 |

OTHER PUBLICATIONS

"Applications of ring laser fields for microstructure creation", Nonlinear Pnenomeno In Complex Systems, vol. 14, No. 3, Nov. 2011 by Anatol Ryzhevich et al. (p. 1) http://www.j-npcs.org/abstracts/vol2011/v14no3/v14no3p236.html.

"A 4M Pixel CMOS Image Sensor for High Speed Image Capture", P. Donegan et al. (pp. 4), Dec. 2005.

"A CMOS image sensor for high-speed imaging", IEEE Xplore—Digital Library, 2000 by Stevanovic, N. et al (p. 1) http://ieeexplore.ieee.org/xpl/articleDetails.jsp?tp=&arnumber=839710&url=http%3A%2F%2Fieeexplore.ieee.org%2Fxpls%2Fabs_all.jsp%3Farnumber%3D839710, Feb. 2000.

"Fast Model-Free Super-Resolution Using a Two-Sensor Camera", Techtransfer, University of Michigan by Andrew Yagle (p. 1), Dec. 2014, http://inventions.umich.edu/technologies/4806_fast-model-free-super-resolution-using-a-two-sensor-camera.

Design and characterization of ionizing radiation-tolerant CMOS APS image sensors up to 30 Mrd (SI) total dose, Nuclear Science, IEEE Xplore Digital Library, vol. 48, Issue 6, Dec. 2001 by EI-Sayed EID et al. (p. 1) http://ieeexplore.ieee.org/xpl/articleDetails.jsp?tp=&arnumber=983133&url=http%3A%2F%2Fieeexplore.ieee.org%2Fxpls%2Fabs all.isp%3Farnumber%3D983133.

"Spatial speckle correlometry in applications to tissue structure monitoring", ResearchGate, Applied Optics, vol. 36, Issue 22, 1997 by D. A. Zimnyakov et al. (p. 1) Sep. 1997 http://www.researchgate.net/ publication/5593616 Spatial speckle correlometry in applications to tissue structure monitori.

"Integrated CMOS Sensors for Fluorescence Spectroscopy and Imaging", ResearchGate, Nov. 2009 by Munir Ei-Desouki et al. (p. 1) http://www.researchgate.net/ publication/249653851 Integrated CMOS Sensors for Fluorescence Spectroscopy and Imaging.

"Applications of ring laser fields for microstructure creation", Nonlinear Pnenomena in Complex Systems, vol. 14, No. 3, Nov. 2011 by Anatol Ryzhevich et al. (p. 1) http://www.j-npcs.org/abstracts/vol2011/v14no3/v14no3p236.html.

"A CMOS Active Pixel Image Sensor with In-pixel CDS for High-Speed Cameras", Jan. 17, 2004 by Toru Inoue et al. (8 pages) http://www.photron.com/whitepapers/a%20CMOS%20Active%20Pixel%20 1mage%20Sensor%20with%201n-pixel%20CDS%20for%20Hidh-Speed%20Cameras.pdf.

"Miniature endoscope for simultaneous optical coherence tomography and laser-induced fluorescence measurement", Applied Optics, vol. 43, No. 1, Jan. 1, 2004 by Alexandre R. Tumlinson et al. (9 pages) http://www2.engr.arizona.edu/~bmeoptics/papers/Miniatureendoscope.pdf.

"CMOS Active-Pixel Sensor With In-Situ Memory for Ultrahigh-Speed Imaging", ResearchGate, Jul. 2011 by M.M. ElDesouki et al. (1 page) http://www.researchgate.net/publication/224184430_CMOS_Active-Pixel_Sensor_Withi_In- Situ Memory for Ultrahigh-Speed Imaging.

"A 4M Pixel CMOS Image Sensor for High Speed Image Capture", P. Donegan et al. (4 pages) Dec 2005.

"A CMOS image sensor for high-speed imaging", IEEE Xplore—Digital Library, 2000 by Stevanovic, N. et al. (1 pages) http://ieeexplore.ieee.org/xpl/articleDetails.jsp?tp=&arnumber=839710&url=http%3A%2F%2Fieeexplore.ieee.org%2Fxpls%2Fabs_all.jsp%3Farnumber%3D839710 Feb 2000.

"Ultra-High-Speed Image Signal Accumulation Sensor," sensors, 2010 by Takeharu Goji Etoh et al. (Page 12) Apr. 2010.

"Fast Model-Free Super-Resolution Using a Two-Sensor Camera", Techtransfer, University of Michigan by Andrew Yagle (p. 1) published No. later than Dec. 2014 http://inventions.umich.edu/technologies/4806fast-model-free-super-resolution-using-a-two-sensor-camera.

* cited by examiner

CONTROLLING MICROPARTICLES THROUGH A LIGHT FIELD HAVING CONTROLLABLE INTENSITY AND PERIODICITY OF MAXIMA THEREOF

CLAIM OF PRIORITY

This patent application claims priority from Application Serial No. u20110312, titled DEVICE FOR FORMATION OF LIGHT FIELD WITH CELLULAR INTENSITY DISTRIBUTION IN TRANSVERSAL SECTION filed on Apr. 19, 2011.

FIELD OF TECHNOLOGY

This disclosure relates generally to controlling microparticles and, more particularly, to controlling microparticles through a light field having controllable intensity and periodicity of maxima thereof.

BACKGROUND

Gradient light beams may be utilized for capturing and/or shifting of microparticles (e.g., influencing ensembles of micro-objects in microtechnology and/or nanotechnology applications with aims including but not limited to regulating movement and/or mixing thereof with regard to organic tissues as part of therapy and/or prophylaxis and influencing materials during localized laser processing). The mechanism of particle capturing may be based on aligning particle dipoles along the direction of a light field. When the light field contains a strong gradient, the particles may be attracted to a region of strongest electric field. The gradient may influence particles in a plane perpendicular to the axis of the light field.

When the longitudinal gradient force balances a dispersion force, the particles having higher refractive index than that of the environment may be captured and localized in intensity maxima of the light field. The particles having lower refractive index than that of the environment may be retracted in local intensity minima of the light field. Optical tweezers utilized for manipulating viruses and bacteria, inducing cellular synthesis in immunology and molecular genetics, capturing and shifting chromosomes, changing mobility of human spermatozoa and trans-membrane proteins etc. may be created based on the aforementioned principle. Gradient light fields may also be utilized for creating optical pumps, funnels and the like with an aim of filtrating particles and/or influencing living and non-living matter.

Devices utilized for forming gradient light fields may not allow for locally rounded intensity maxima to be formed. Although a Fresnel biprism allows formation of a static gradient light field in the form of parallel strips, the Fresnel biprism may not allow formation of a variable gradient light field in addition to not enabling formation of a light field having locally rounded intensity maxima.

An optical setup including a source of laser radiation, a telescope-collimator and a pyramid with four edges may enable formation of a gradient light field (e.g., a quadrabeam). However, the aforementioned gradient light field may be static, with a multitude of periodically distributed intensity maxima having same magnitudes in a transverse direction.

SUMMARY

Disclosed are a method, a device and/or a system of controlling microparticles through a light field having controllable intensity and periodicity of maxima thereof.

In one aspect, a method includes providing a capability to control divergence of a coherent light beam having an axially symmetrical distribution of intensity thereof through an optical divergence controller, and directing an output of the optical divergence controller related to the controlled divergence of the coherent light beam onto a glass prism. The glass prism includes a planar shape onto which a pyramidal structure is formed. The glass prism is positioned such that the output of the optical divergence controller is incident on a planar surface of the planar shape or the pyramidal structure.

The method also includes controlling a distance between maxima of an output light field of the glass prism and intensity thereof through controlling the divergence of the coherent light beam through the optical divergence controller and/or varying a distance between the optical divergence controller and the glass prism, and utilizing the output light field of the glass prism in controlling microparticles in a microtechnology or a nanotechnology application.

In another aspect, an optical device includes an optical divergence controller to provide a capability to control divergence of a coherent light beam having an axially symmetrical distribution of intensity thereof, and a glass prism including a planar shape onto which a pyramidal structure is formed. The glass prism is positioned such that an output of the optical divergence controller is incident on a planar surface of the planar shape or the pyramidal structure. Controlling the divergence of the coherent light beam through the optical divergence controller and/or varying a distance between the optical divergence controller and the glass prism enables controlling a distance between maxima of an output light field of the glass prism and intensity thereof. The output light field of the glass prism is configured to be utilized in controlling microparticles in a microtechnology or a nanotechnology application.

In yet another aspect, an optical system includes an optical divergence controller to provide a capability to control divergence of a coherent light beam having an axially symmetrical distribution of intensity thereof, and a glass prism including a planar shape onto which a pyramidal structure is formed. The glass prism is positioned such that an output of the optical divergence controller is incident on a planar surface of the planar shape or the pyramidal structure. The optical system also includes an ensemble of microparticles.

Controlling the divergence of the coherent light beam through the optical divergence controller and/or varying a distance between the optical divergence controller and the glass prism enables controlling a distance between maxima of an output light field of the glass prism and intensity thereof. The output light field of the glass prism is configured to be utilized in controlling the ensemble of microparticles.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, a device and/or a system of controlling microparticles through a light field having controllable intensity and periodicity of maxima thereof. Although the present embodiments have been described with reference to specific example embodiments, it will be evident that various modifications and changes may be made to these embodiments without departing from the broader spirit and scope of the various embodiments.

Figure 1:
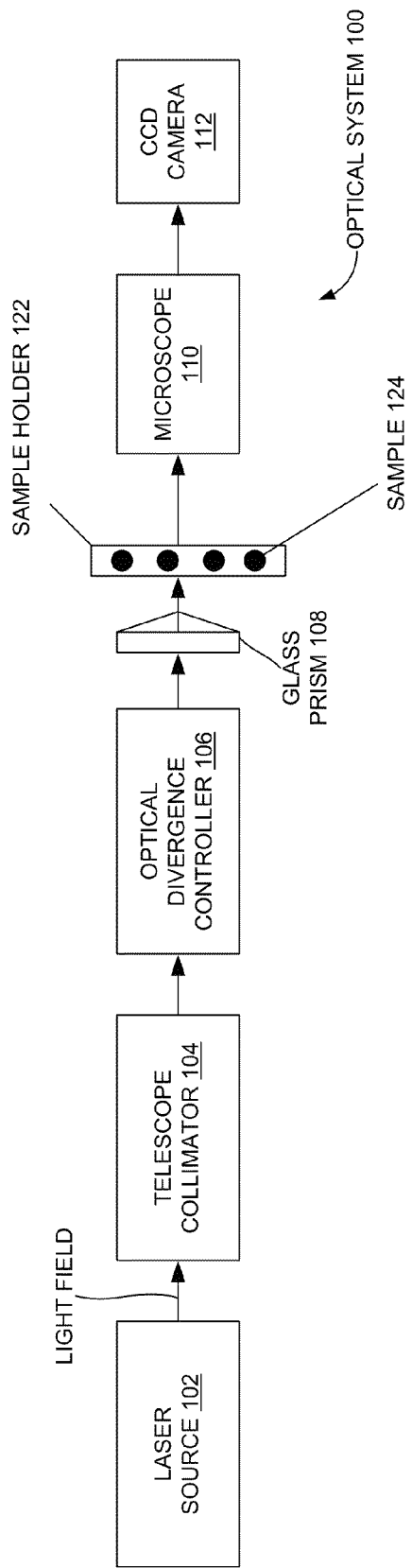
FIG. 1 is a schematic view of an optical system, according to one or more embodiments.

FIG. 1 shows an optical system 100, according to one or more embodiments. In one or more embodiments, optical system 100 may include a laser source 102 and a telescope collimator 104 configured to form a collimated coherent beam of light with axially symmetrical distribution of intensity. In one or more embodiments, the collimated coherent beam of light may be directed onto an optical divergence controller 106 that is configured to control divergence of the collimated coherent beam of light. In one example embodiment, optical divergence controller 106 may be a spherical lens with varying focal distance. Depending on the adjustment of optical divergence controller 106, convergent or divergent light beams may be generated therefrom.

In one or more embodiments, optical system 100 may include a glass prism 108 onto which the convergent or the divergent beam from optical divergence controller 106 is incident. In one example embodiment, glass prism 108 may include a rectangular cuboid onto which a square pyramid is formed. In one or more embodiments, a pyramidal surface of glass prism 108 may be a pure pyramid; alternately, the pyramidal surface may be a pyramid truncated on an edge thereof in a different manner (e.g., truncated on a square-shaped plane, a round-shaped plane, arbitrarily truncated). The shape(s) of glass prism 108 shown in FIG. 1, therefore, should not be considered limiting. In one example embodiment, glass prism 108 may be positioned such that the light beam is incident on a planar surface of the rectangular cuboid, with the square pyramid (an example shape) being along the direction of incidence; it should be noted that glass prism 108 may also be positioned such that the light beam is incident on a prism side thereof (and similarly for other variations of glass prism 108).

In one or more embodiments, when a convergent light beam is incident on glass prism 108, a convergent quadrabeam may be formed, with the convergent quadrabeam representing a cellular field in which the distance between maxima (or, cell period) decreases proportionally with distance. In one or more embodiments, when a divergent light beam is incident on glass prism 108, a divergent quadrabeam may be formed, with the divergent quadrabeam representing a cellular field in which the distance between maxima (or, cell period) increases with distance.

In one or more embodiments, through increasing divergence of the beam incident on glass prism 108 through optical divergence controller 106, the intensity of maxima of the cellular field and distances between maxima thereof (or, cell period) may be increased. Likewise, through decreasing divergence of the beam incident on glass prism 108 through optical divergence controller 106, the intensity of maxima of the cellular field and the distances between maxima thereof (or, cell period) may be decreased.

In one or more embodiments, with an increase in a width (or, dimension along the direction of incidence of the beam) of the square pyramid portion of glass prism 108, the distance between maxima of the cellular field (or, cell period) may increase. Likewise, with decrease in the width of the square pyramid portion of glass prism 108, the distance between maxima of the cellular field (or, cell period) may decrease. Thus, it may be possible to tune the distance between the maxima of the cellular field (or, cell period) through tuning divergence and/or through utilizing glass prisms (e.g., glass prism 108, or, another glass prism instead of glass prism 108) of varying widths.

Figure 2:
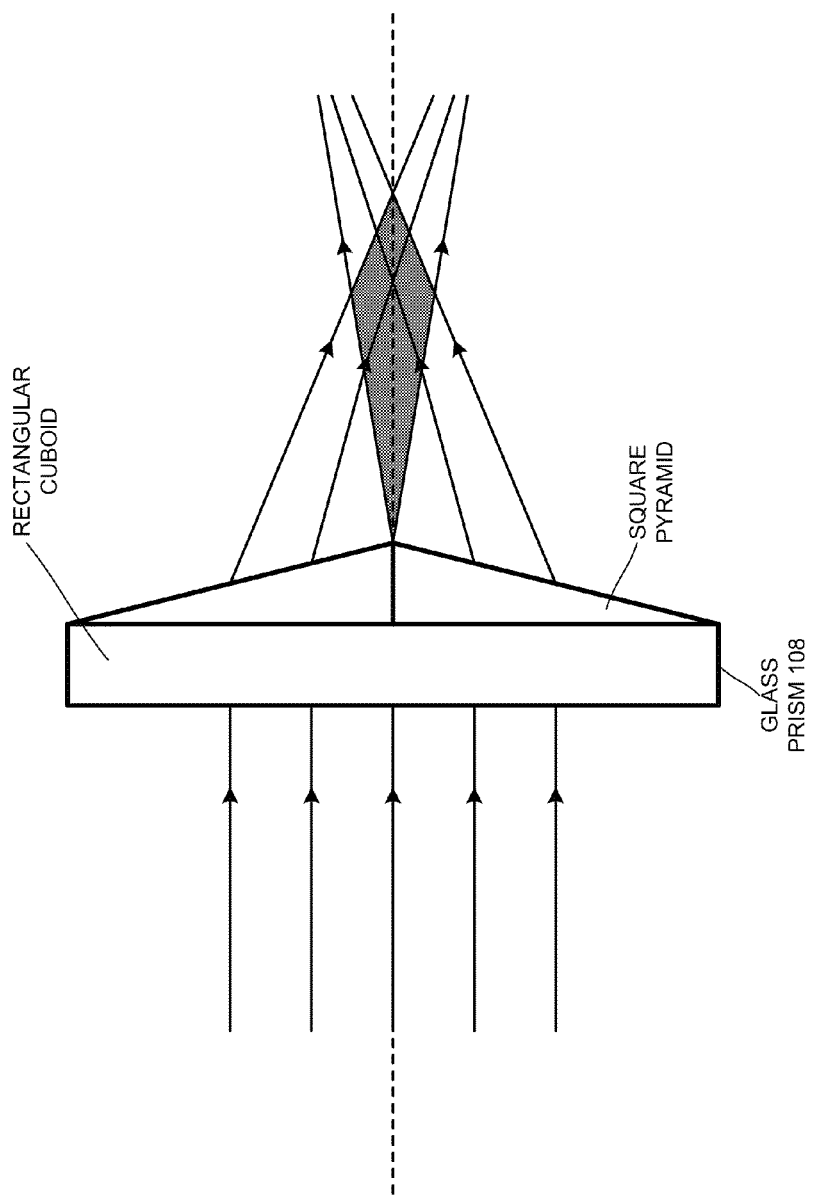
FIG. 2 is a ray diagram of a convergent beam incident on a glass prism of the optical system of FIG. 1, according to one or more embodiments.
Figure 3:
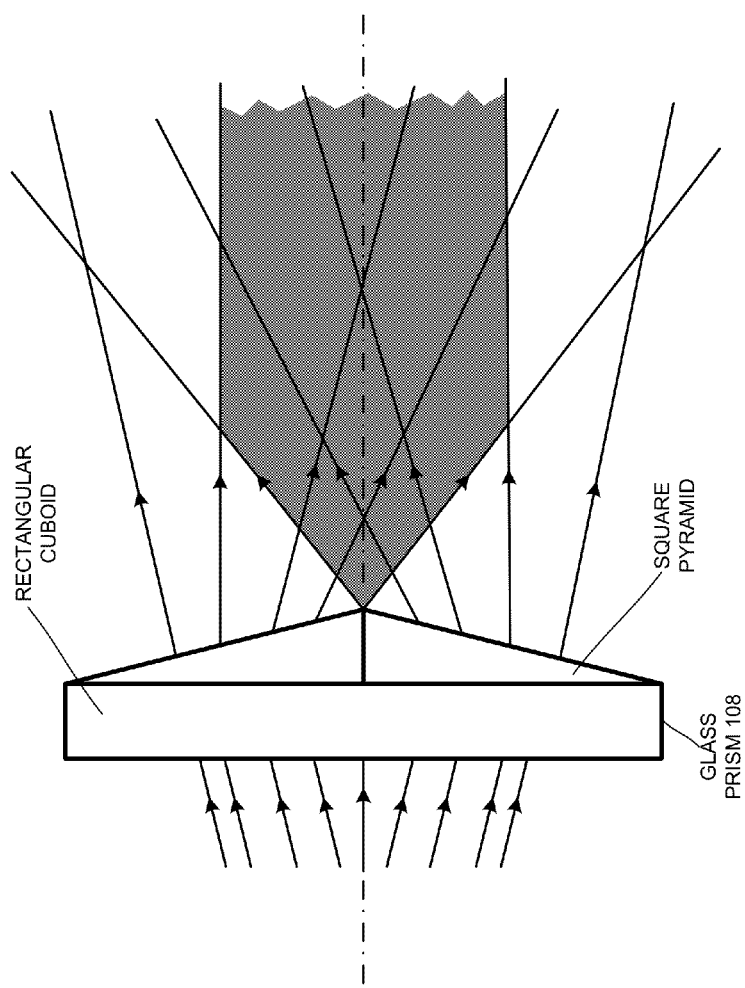
FIG. 3 is a ray diagram of a divergent beam incident on the glass prism of the optical system of FIG. 1, according to one or more embodiments.
Figure 4:
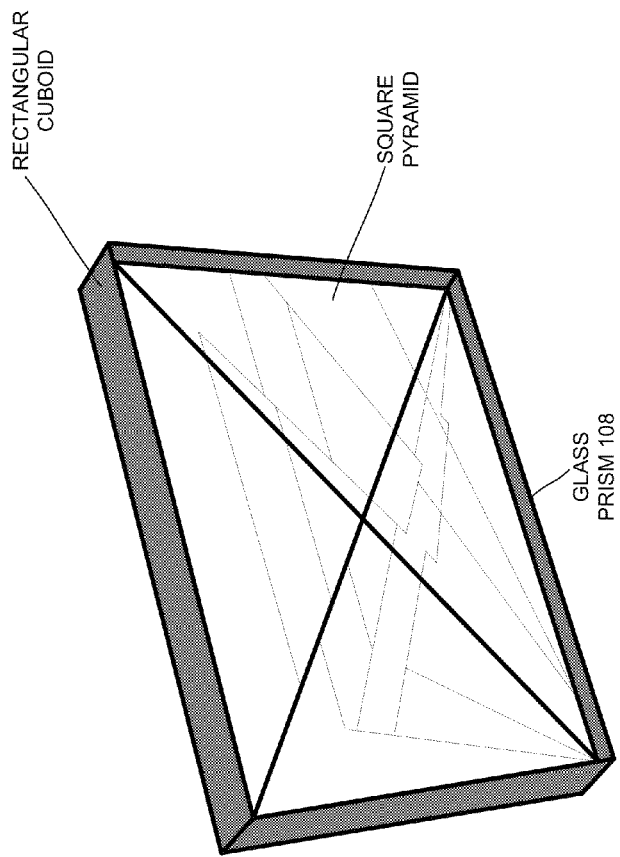
FIG. 4 is a perspective view of the glass prism of the optical system of FIG. 1.

FIG. 1 also shows a microscope 110 and a Charge Coupled Device (CCD) camera 112 to observe, register and/or investigate the cellular field. It is obvious that the aforementioned devices have been included merely for illustrative purposes, and that other devices within an experimental setup are within the scope of the exemplary embodiments. FIG. 2 shows a ray diagram of a convergent beam incident on glass prism 108, according to one or more embodiments. FIG. 3 shows a ray diagram of a divergent beam incident on glass prism 108, according to one or more embodiments. FIG. 4 shows a perspective view of glass prism 108, according to one or more embodiments.

Figure 5:
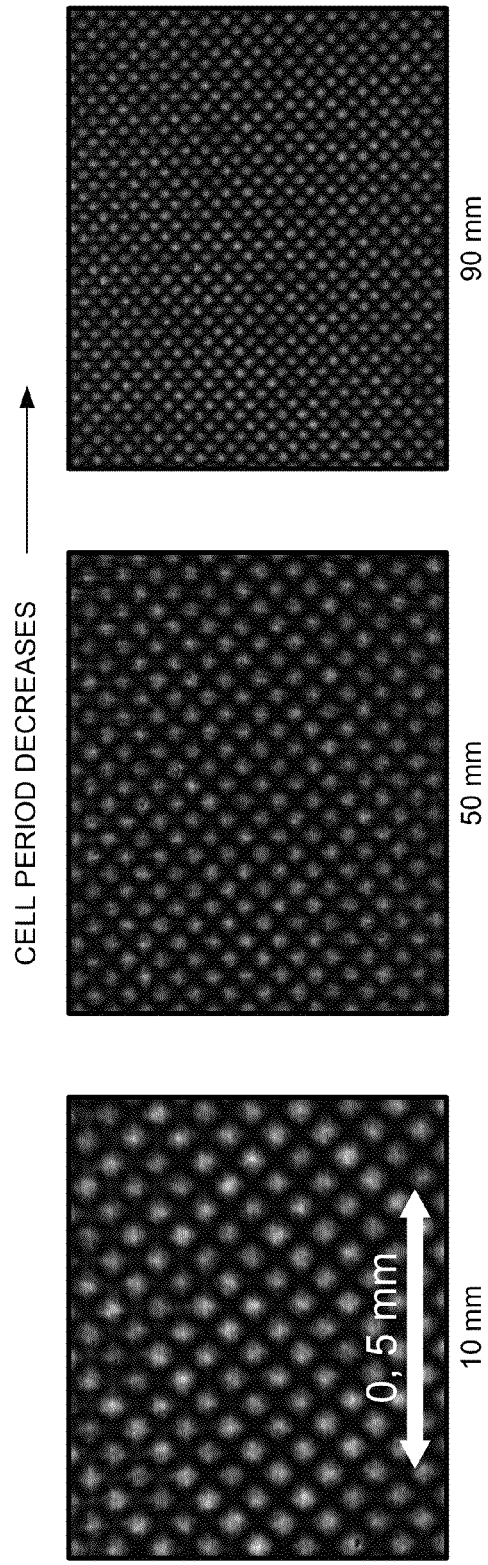
FIG. 5 is a plot of a longitudinal distribution of a convergent cellular field as a function of distance between the glass prism and an optical divergence controller of the optical system of FIG. 1.

FIG. 5 shows the longitudinal distribution of a convergent cellular field as a function of distance between glass prism 108 and optical divergence controller 106. As seen in FIG. 5, when the distance between glass prism 108 and optical divergence controller 106 is increased (from 10 mm to 50 mm to 90 mm), the distance between maxima in the intensity distribution across a transverse section of the convergent cellular field decreases. The beam incident on glass prism 108 may be more convergent as the distance between glass prism 108 and optical divergent controller 106 is increased, thereby contributing to the distance between maxima in the cellular field being reduced.

Figure 6:
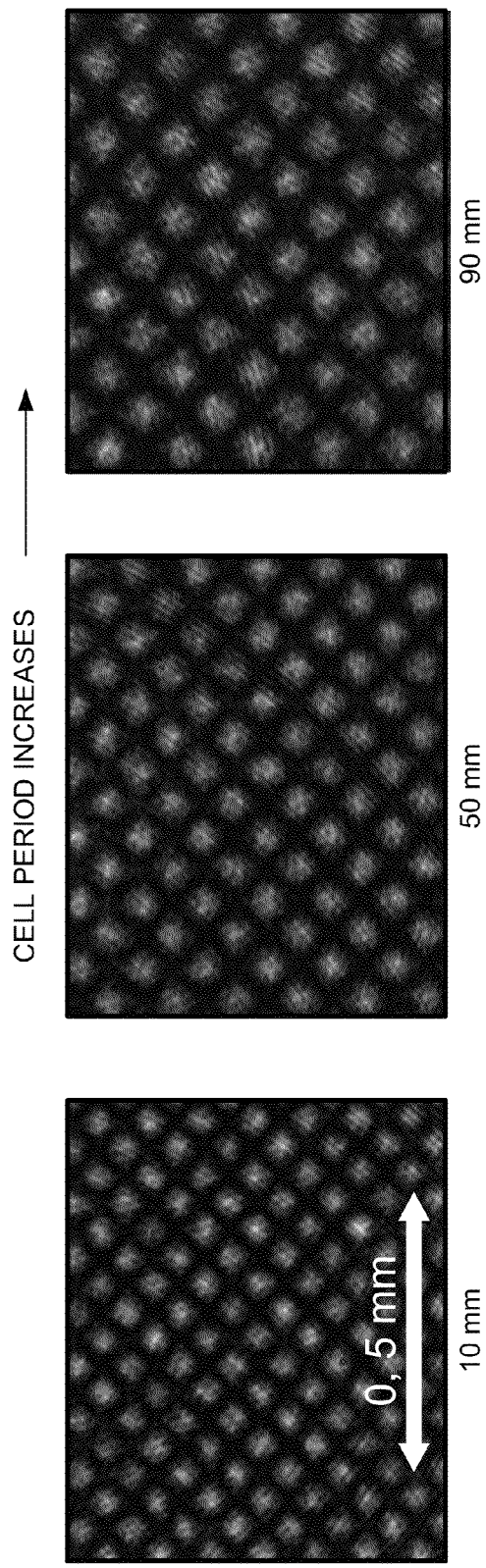
FIG. 6 is a plot of a longitudinal distribution of a divergent cellular field as a function of distance between the glass prism and an optical divergence controller of the optical system of FIG. 1.

FIG. 6 shows the longitudinal distribution of a divergent cellular field as a function of distance between glass prism 108 and optical divergence controller 106. As seen in FIG. 6, when the distance between glass prism 108 and optical divergence controller 106 is increased (from 10 mm to 50 mm to 90 mm), the distance between maxima in the intensity distribution across a transverse section of the divergent cellular field increases. The beam incident on glass prism 108 may be more divergent as the distance between glass prism 108 and optical divergent controller 106 is increased, thereby contributing to the distance between maxima in the cellular field being increased.

Thus, in one or more embodiments, optical system 100 may allow for formation of a gradient light field with a cellular distribution of intensity in a transverse section thereof, the cellular distribution including a set of controllable periodically distributed intensity maxima. In one or more embodiments, the cell period of the cellular field may be controlled/regulated in an arbitrary plane perpendicular to an axis of symmetry thereof.

Exemplary embodiments may, therefore, allow for dosated (e.g., through laser) influence on ensembles of micro-objects (e.g., micro-particles) in microtechnology and nanotechnology applications as discussed above in the Background section. Referring back to FIG. 1, a sample 124 (e.g., microparticles) may be placed (e.g., in a sample holder 122) such that particles of sample 124 are configured to interact with the gradient light field to be influenced thereby; in other words, sample 124 may be placed between glass prism 108 and microscope 110. In one example embodiment, sample holder 122 may be a cuvette; it should be noted that sample holder 122 may be made of various types of materials (e.g., glass). In one or more embodiments, sample holder 122 may/may not serve to shape the gradient light field.

Figure 7:
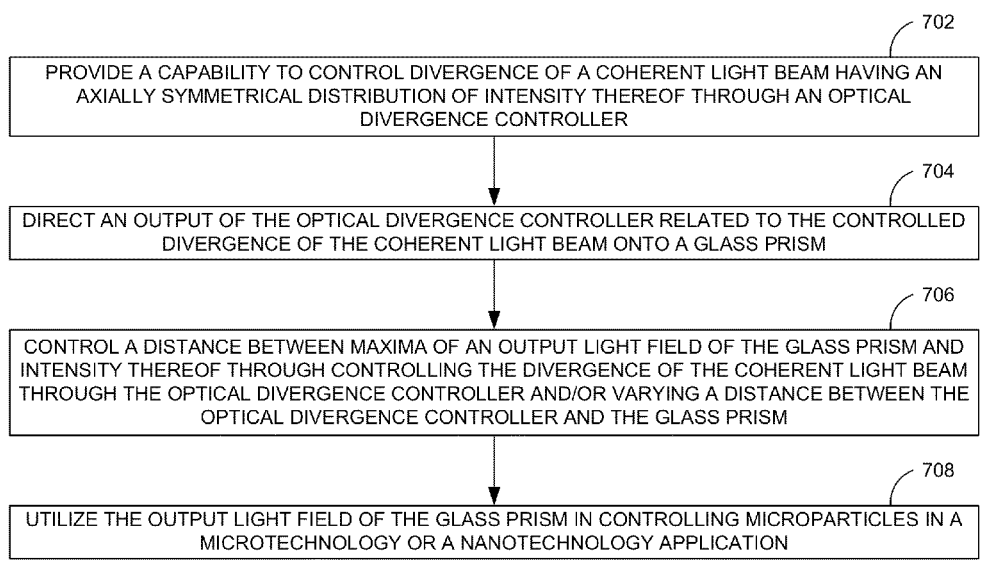
FIG. 7 is a process flow diagram detailing the operations involved in controlling microparticles through a light field having controllable intensity and periodicity of maxima thereof, according to one or more embodiments.

FIG. 7 shows a process flow diagram detailing the operations involved in controlling microparticles through a light field having controllable intensity and periodicity of maxima thereof, according to one or more embodiments. In one or more embodiments, operation 702 may involve providing a capability to control divergence of a coherent light beam having an axially symmetrical distribution of intensity thereof through optical divergence controller 106. In one or more embodiments, operation 704 may involve directing an output of optical divergence controller 106 related to the controlled divergence of the coherent light beam onto glass prism 108. In one or more embodiments, glass prism 108 may include a planar shape onto which a pyramidal structure is formed.

In one or more embodiments, glass prism 108 may be positioned such that the output of optical divergence controller 106 is incident on a planar surface of the planar shape or the pyramidal structure. In one or more embodiments, operation 706 may involve controlling a distance between maxima of an output light field of glass prism 108 and intensity thereof through controlling the divergence of the coherent light beam through optical divergence controller 106 and/or varying a distance between optical divergence controller 106 and glass prism 108. In one or more embodiments, operation 708 may then involve utilizing the output light field of glass prism 108 in controlling microparticles in a microtechnology or a nanotechnology application.

Although the present embodiments have been described with reference to specific example embodiments, it will be evident that various modifications and changes may be made to these embodiments without departing from the broader spirit and scope of the various embodiments. Accordingly, the specification and drawings are to be regarded in an illustrative rather than a restrictive sense.

What is claimed is:

1. An optical device comprising:
   a laser source;
   a telescope collimator in an optical path immediately following the laser source to form a collimated coherent light beam having an axially symmetrical distribution of intensity thereof;
   an optical divergence controller in an optical path immediately following the telescope collimator to provide a capability to control divergence of the collimated coherent light beam; and
   a glass prism including a planar shape onto which a pyramidal structure is formed, the glass prism being positioned in an optical path immediately following the optical divergence controller such that an output of the optical divergence controller is incident on one of a planar surface of the planar shape and the pyramidal structure,
   wherein at least one of: controlling the divergence of the collimated coherent light beam through the optical divergence controller and varying a distance between the optical divergence controller and the glass prism enables controlling a distance between maxima of an output light field of the glass prism and intensity thereof,
   wherein the output light field of the glass prism is configured to be utilized in controlling microparticles in one of a microtechnology and a nanotechnology application, the microparticles being configured to be placed as part of a sample within a sample holder in an optical path immediately following the glass prism.

2. The optical device of claim 1, wherein the optical divergence controller is a spherical lens with varying focal distance.

3. The optical device of claim 1, further comprising at least one of a microscope and a CCD camera to at least one of observe, register and investigate the output light field of the glass prism.

4. The optical device of claim 1, wherein the output light field of the glass prism is configured to be utilized to allow for dosated laser influence on ensembles of the microparticles.

5. An optical system comprising:
   a laser source;
   a telescope collimator in an optical path immediately following the laser source to form a collimated coherent light beam having an axially symmetrical distribution of intensity thereof;
   an optical divergence controller in an optical path immediately following the telescope collimator to provide a capability to control divergence of the collimated coherent light beam;
   a glass prism including a planar shape onto which a pyramidal structure is formed, the glass prism being positioned in an optical path immediately following the optical divergence controller such that an output of the optical divergence controller is incident on one of a planar surface of the planar shape and the pyramidal structure; and
   an ensemble of microparticles as part of a sample within a sample holder in an optical path immediately following the glass prism,
   wherein at least one of: controlling the divergence of the collimated coherent light beam through the optical divergence controller and varying a distance between the optical divergence controller and the glass prism enables controlling a distance between maxima of an output light field of the glass prism and intensity thereof, and
   wherein the output light field of the glass prism is configured to be utilized in controlling the ensemble of microparticles.

6. The optical system of claim 5, wherein the optical divergence controller is a spherical lens with varying focal distance.

7. The optical system of claim 5, further comprising at least one of a microscope and a CCD camera to at least one of observe, register and investigate the output light field of the glass prism.

* * * * *